United States Patent
Rocheux et al.

(10) Patent No.: US 8,524,091 B2
(45) Date of Patent: Sep. 3, 2013

(54) APPARATUS, SYSTEM, AND METHOD FOR FILTRATION OF A DOSING FLUID IN AN EXHAUST AFTERTREATMENT SYSTEM

(75) Inventors: Alain Rocheux, Quimper (FR); Gary L. Rickle, Wharton, OH (US); Julie A. Graber, Fostoria, OH (US); Vikrant Aggarwal, Nashville, TN (US)

(73) Assignee: Kuss Filtration Inc., Findlay, OH (US)

( * ) Notice: Subject to any disclaimer, the term of this patent is extended or adjusted under 35 U.S.C. 154(b) by 0 days.

(21) Appl. No.: 13/435,053

(22) Filed: Mar. 30, 2012

(65) Prior Publication Data

US 2012/0183459 A1 Jul. 19, 2012

Related U.S. Application Data

(63) Continuation of application No. 13/155,072, filed on Jun. 7, 2011, which is a continuation of application No. 11/865,469, filed on Oct. 1, 2007, now Pat. No. 7,976,712.

(51) Int. Cl.
*B01D 50/00* (2006.01)

(52) U.S. Cl.
USPC .......................................... 210/774; 210/805

(58) Field of Classification Search
USPC ........... 60/303, 310; 422/173, 177; 423/212; 220/562; 210/767, 774, 805
See application file for complete search history.

(56) References Cited

U.S. PATENT DOCUMENTS

| | | | |
|---|---|---|---|
| 1,697,835 A | 1/1929 | McGill | |
| 2,100,482 A | 11/1937 | Irwine | |
| 3,883,639 A | 5/1975 | Cronkright | |
| 4,478,620 A | 10/1984 | Tamura | |
| 4,772,401 A | 9/1988 | Rawlins | |
| 4,828,717 A | 5/1989 | DeLeeuw et al. | |
| 5,902,480 A | 5/1999 | Chilton et al. | |
| 6,102,377 A | 8/2000 | Doughty | |
| 6,382,190 B1 | 5/2002 | Tanabe et al. | |
| 6,613,227 B2 | 9/2003 | Rickle | |
| 6,722,124 B2 | 4/2004 | Pawson et al. | |
| 6,887,376 B2 | 5/2005 | Cella et al. | |
| 7,207,320 B2 | 4/2007 | Ikeya | |
| 7,775,036 B2 | 8/2010 | Barcin | |
| 8,173,013 B2 | 5/2012 | Sato et al. | |

(Continued)

FOREIGN PATENT DOCUMENTS

| DE | 10 2006 019 973 | 10/2007 |
|---|---|---|
| WO | WO 2007/017080 | 2/2007 |

OTHER PUBLICATIONS

Search Report issued Jun. 16, 2009 by the Institut National de la Propriété Industrielle in Application No. FR 0806067.

(Continued)

*Primary Examiner* — Robert A Hopkins (74) *Attorney, Agent, or Firm* — Brinks Hofer Gilson & Lione (57) ABSTRACT

An apparatus, system, and method are disclosed for a filter for filtering a dosing fluid in an exhaust aftertreatment system. The filter may comprise a dosing tank configured to contain a dosing fluid, a filter media disposed within the dosing tank, and a support structure supporting the filter media to form a pathway for a flow of dosing fluid. Beneficially, the apparatus, system, and method of the present invention reduce the cost of operation and manufacture of the SCR system.

7 Claims, 9 Drawing Sheets

(56) References Cited

U.S. PATENT DOCUMENTS

| | | |
|---|---|---|
| 2004/0256308 A1 | 12/2004 | Yates |
| 2005/0013756 A1 | 1/2005 | Amou et al. |
| 2006/0065591 A1 | 3/2006 | Joseph |
| 2006/0107638 A1 | 5/2006 | Holzmann et al. |
| 2006/0207234 A1 | 9/2006 | Ward et al. |
| 2006/0233688 A1 | 10/2006 | Barckholtz et al. |
| 2006/0266701 A1 | 11/2006 | Dickerson et al. |
| 2007/0044443 A1 | 3/2007 | Nixdorf et al. |
| 2007/0119153 A1 | 5/2007 | Pierz et al. |
| 2007/0131793 A1 | 6/2007 | Joseph et al. |
| 2007/0196243 A1* | 8/2007 | Osaku et al. .......... 422/102 |
| 2007/0199308 A1 | 8/2007 | Satou et al. |
| 2007/0267071 A1 | 11/2007 | Milton |
| 2008/0011667 A1 | 1/2008 | Ruschke |
| 2008/0135469 A1 | 6/2008 | Fremont et al. |
| 2009/0007527 A1 | 1/2009 | Mitsudou |
| 2009/0078692 A1 | 3/2009 | Starck |

OTHER PUBLICATIONS

USPTO Non-Final Office Action for U.S. Appl. No. 13/155,072 dated Apr. 25, 2013.

* cited by examiner

APPARATUS, SYSTEM, AND METHOD FOR FILTRATION OF A DOSING FLUID IN AN EXHAUST AFTERTREATMENT SYSTEM

BACKGROUND OF THE INVENTION

1. Field of the Invention

This invention relates to filtration and more particularly relates to filtration of dosing fluid in an exhaust aftertreatment system.

2. Description of the Related Art

Many internal combustion engines produce nitrogen oxides (NOx) as a by-product of combustion. Diesel engines in particular produce a relatively high amount of NOx in operation. Engines typically release NOx through the exhaust stream of the engine.

NOx is a pollutant that may aggravate asthmatic conditions, react with the oxygen in the air to produce ozone, and eventually form nitric acid when dissolved in water. Acid rain and smog are often attributed to the release of NOx from internal combustion engines.

Since the release of NOx is undesirable, various schemes have been implemented to reduce NOx emissions. One such scheme is a selective catalytic reduction (SCR) exhaust aftertreatment system. An SCR system reduces NOx emission using a chemical reaction between the exhaust gases, an additive, and a catalyst. A gaseous or liquid dosing fluid (most commonly ammonia or urea) is added to the exhaust gas and is absorbed onto a catalyst. The dosing fluid reacts with NOx in the exhaust gas to form harmless H2O (water vapour) and N2 (nitrogen gas).

In operation, an SCR system typically involves a tank of dosing fluid carried with the vehicle. The dosing fluid is pumped from the tank through an injector into the exhaust stream. One difficulty associated with SCR systems is contamination in the dosing fluid. This contamination can take the form of dirt or other foreign debris suspended in the dosing fluid, fragments worn off of elements of the SCR system, such as small pieces of an impeller from a pump, or other material. This contamination can restrict the flow of dosing fluid anywhere in the SCR system, but is particularly troublesome in the injector. Foreign material may lodge in the relatively small injector, reducing or eliminating the flow of the dosing fluid into the exhaust stream.

Some SCR systems include paper filters in housings between the tank of dosing fluid and the injector to reduce the incidence of contaminants in the injected dosing fluid. While these filters can improve the performance of the SCR system, they also introduce new difficulties. The paper filters have a capacity for holding contaminants that is low enough to require regular servicing over the life of the engine. Typically this involves replacing or cleaning the paper filter.

In addition, the dosing fluids used in SCR systems often have a relatively high freezing point. Urea, for example, has a freezing point of around −11 degrees Celsius. If a dosing fluid is allowed to settle in the filter housing in cold temperatures, the dosing fluid in the filter housing will freeze, eliminating the flow of dosing fluid and often damaging the SCR system. As a result, vehicles with SCR systems operating in cold temperatures often include heaters in the filter housings of the SCR system.

The existing approaches to filtering dosing fluids in SCR systems have high costs associated with both manufacturing and maintenance. Regular replacement of paper filter elements may require expensive service fees, and the addition of a heater element to a filter housing increases the cost to manufacture the system. These costs are ultimately borne by purchasers, owners, and operators of vehicles using these systems.

SUMMARY OF THE INVENTION

From the foregoing discussion, it should be apparent that a need exists for an apparatus, system, and method that filter a dosing fluid in an SCR system. Beneficially, such an apparatus, system, and method would reduce the cost of operation and manufacture of the SCR system while filtering contaminants from the dosing fluid.

The present invention has been developed in response to the present state of the art, and in particular, in response to the problems and needs in the art that have not yet been fully solved by currently available filtration methods in exhaust aftertreatment systems. Accordingly, the present invention has been developed to provide an apparatus, system, and method for filtration of a dosing fluid in an exhaust aftertreatment system that overcome many or all of the above-discussed shortcomings in the art.

A filter is provided with a plurality of modules configured to functionally execute the necessary steps of filtering dosing fluid. These modules in the described embodiments include a dosing tank configured to contain a dosing fluid, a filter media disposed within the dosing tank, and a support structure supporting the filter media to form a pathway for a flow of dosing fluid.

The filter media, in one embodiment, is disposed at an outlet port of the dosing tank such that the dosing fluid travels through the filter media before or upon exiting the dosing tank. In another embodiment, the filter media is disposed at an inlet port of the dosing tank such that the dosing fluid travels through the filter media before or upon entering the dosing tank. The filter, in a further embodiment, includes an attachment mechanism configured to attach the filter to one of an inlet port and an outlet port of the dosing tank.

The filter media, in one embodiment, comprises polymeric, melt-blown microfilaments having a substantially constant diameter. In another embodiment, the structure comprises one or more ribs disposed on the filter media. In a further embodiment, the filter media comprises a plurality of layers, each of the plurality of layers having a unique and substantially constant porosity, the plurality of layers arranged such that the porosity decreases from an inlet of the filter to an outlet of the filter.

In a further embodiment, the filter media may comprise a material selected from the group consisting of nylon, polyester, polyoxymethylene (POM), polybutylene terephthalate (PBT), polyethylene terephthalate (PET), polyethylene naphthalate (PEN), polybutelyne naphthalate (PBN), HD-Polypropylene, Polyfluorethylen, Polyvinylidenedifluoride, Poly(perfluoroalkoxy) PFA, Polyisobutylene, Viton, LD-Polyethylene, and HD-Polyethylene. In a further embodiment, the filter media comprises depth media.

A system of the present invention is also presented to filter a dosing fluid in an exhaust aftertreatment system. The system may be embodied by a dosing fluid for an exhaust aftertreatment system, a dosing tank configured to contain the dosing fluid, a filter, a pump configured to pump the dosing fluid, and an injector configured to inject the dosing fluid into an exhaust stream. In particular, the filter in the system, in one embodiment, includes a filter media disposed within the dosing tank such that the dosing fluid travels through the filter media before exiting the dosing tank. The filter media may further include a support structure supporting the filter media to form a pathway for a flow of dosing fluid The filter media of the system may further be disposed within the dosing tank at an outlet port of the dosing tank such that the dosing fluid travels through the filter media before or upon exiting the dosing tank in one embodiment. In another embodiment, the system may include a heater configured to heat the dosing fluid and the filter media in the dosing tank. The dosing fluid, in one embodiment of the system, is a mono-nitrogen oxide (NOx) reducing agent. The dosing fluid, in a further embodiment, is selected from the group consisting of urea, ammonia, and a hydrocarbon fuel.

In another embodiment of the system, the filter media may comprise a plurality of layers, each of the plurality of layers having a unique and substantially constant porosity, the plurality of layers arranged such that the porosity decreases from an inlet of the filter to an outlet of the filter.

A method of the present invention is also presented for filtering a dosing fluid in an exhaust aftertreatment system. The method in the disclosed embodiments substantially includes the steps necessary to carry out the functions presented above with respect to the operation of the described apparatus and system. In one embodiment, the method includes containing a dosing fluid in a dosing tank, the tank containing a filter media. The method also may include urging the dosing fluid through the filter media. In one embodiment, the method further includes causing the dosing fluid to exit the tank.

In a further embodiment, the method includes heating the dosing fluid within the dosing tank. In another embodiment, the method includes pumping the dosing fluid through a recirculation line.

A method of the present invention is also presented for deploying a filter for a dosing fluid in an exhaust aftertreatment system. The method in the disclosed embodiments substantially includes the steps necessary to carry out the functions presented above with respect to the operation of the described apparatus and system. In one embodiment, the method includes providing a filter media having a minimum porosity smaller than a contaminant in a dosing fluid. The method, in certain embodiments, further includes placing the filter media within a dosing tank, the dosing tank configured to contain a dosing fluid used in an exhaust aftertreatment system, the filter media being placed in such a location that the dosing fluid passes through the filter media before exiting the tank.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
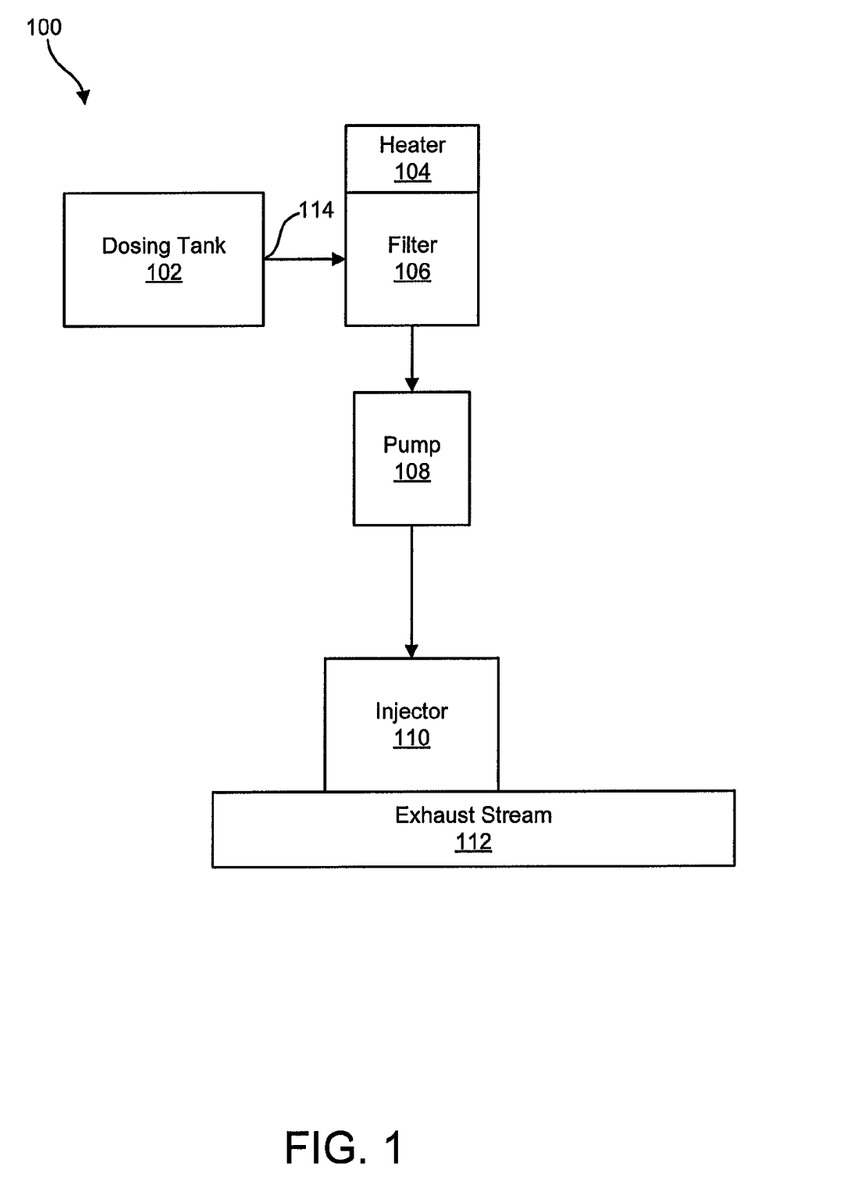
FIG. 1 is a schematic block diagram illustrating one embodiment of a dosing system for an exhaust aftertreatment system.

FIG. 1 is a schematic block diagram illustrating one embodiment of a dosing system 100 for an exhaust aftertreatment system. The dosing system 100 comprises a dosing tank 102, a heater 104, a filter 106, a pump 108, an injector 110, and an exhaust stream 112. The dosing system 100 injects a dosing fluid into an exhaust stream 112 to reduce pollutants in the exhaust stream 112.

The dosing tank 102, in one embodiment, contains a dosing fluid for use in the dosing system 100. The dosing tank 102 may include an outlet 114 through which dosing fluid exits the dosing tank 102. The dosing tank 102 may comprise any material capable of holding the dosing fluid, such as a polymer, a metal, or the like.

The filter 106 receives dosing fluid from the dosing tank 102. The filter 106 may be connected to the dosing tank by a hose, a tube, a channel, or the like. The filter 106 removes contaminants from the dosing fluid. The filter 106 may comprise a cellulose material, a polymer material, a mesh, or the like.

In one embodiment, the filter 106 includes a heater 104 configured to heat the dosing fluid in the filter 106. The heater 104 maintains the dosing fluid in the filter 106 above the freezing temperature of the dosing fluid. In one embodiment, the heater 104 comprises an electrically resistive element that generates heat in response to the passage of an electric current through the element.

The pump 108 receives dosing fluid from the filter 106 and pumps the dosing fluid throughout the system 100. The pump 108 may be connected to the filter 106 by a hose, a tube, a channel, or the like. The pump 108, in one embodiment, may comprise a bladder pump, a peristaltic pump, or another pump commonly used in the art.

The injector 110 injects dosing fluid into the exhaust stream 112, in one embodiment. The injector 110 may comprise one or more orifices configured to deliver the dosing fluid to the exhaust stream 112.

Figure 2:
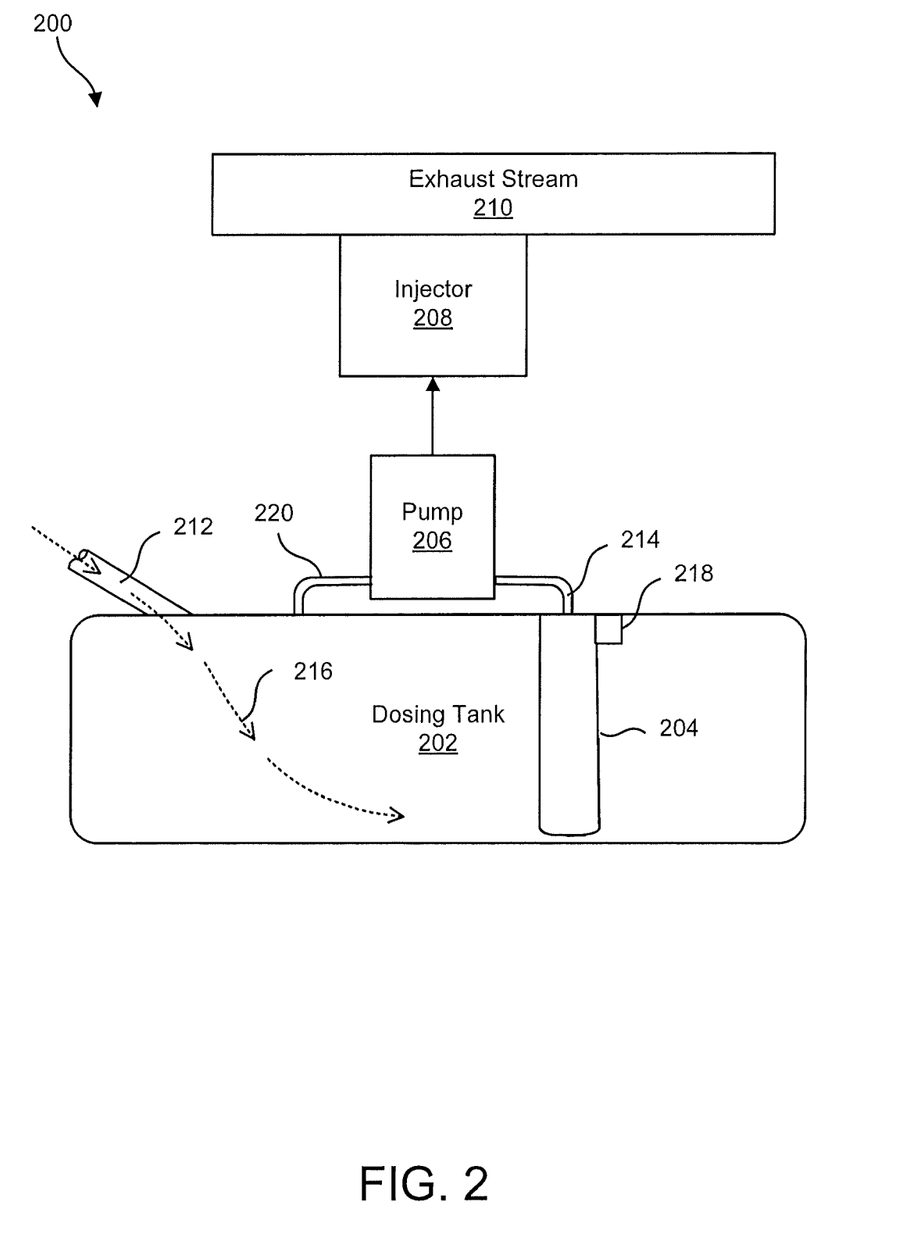
FIG. 2 is a schematic block diagram illustrating one embodiment of a dosing system for an exhaust aftertreatment system in accordance with the present invention.

FIG. 2 is a schematic block diagram illustrating one embodiment of a dosing system 200 for an exhaust aftertreatment system in accordance with the present invention. The dosing system 200 may include a dosing tank 202 with an internal filter 204, a pump 206, an injector 208, and an exhaust stream 210. The dosing system 200 injects a dosing fluid into an exhaust stream 210 to reduce pollutants in the exhaust stream 210.

The dosing tank 202, in one embodiment, includes an inlet 212, an outlet 214, and an internal filter 204. The dosing tank 202 receives, stores, and delivers a dosing fluid for use in the dosing system 200. The dosing fluid may be any reducing agent used to treat mono-nitrogen oxides (NOx) in a flow of exhaust. For example, the dosing fluid may be urea, ammonia, a hydrocarbon fuel, or the like. The dosing tank 202 may comprise any material capable of holding the dosing fluid, such as a polymer, a metal, or the like.

The inlet 212 receives a flow of dosing fluid 216. The flow of dosing fluid 216 enters the dosing tank 202 as illustrated by the dashed arrows. The outlet 214 delivers a flow of dosing fluid from the dosing tank 202 to other elements of the dosing system 200.

The internal filter 204, in one embodiment, is disposed within the dosing tank 202. Disposing the filter 204 within the dosing tank 202 eliminates the need for a separate heater for the filter 204. In one embodiment, the internal filter 204 is disposed within the dosing tank 202 at the outlet 214 of the dosing tank 202. In this embodiment, dosing fluid exiting the dosing tank 202 passes through the internal filter 204. As the dosing fluid passes through the internal filter 204, contaminants suspended within the dosing fluid are trapped by the internal filter 204.

The internal filter 204 may include a filter media. The filter media may comprise any media capable of removing contaminants from a dosing fluid. For example, the filter media may comprise a cellulose material. In another example, the filter media may comprise a polymer material. In one embodiment, the filter media may comprise a melt-blown polymer depth media, as described below in relation to FIG. 7.

In certain embodiments, the internal filter 204 is connected to the dosing tank 204 by an attachment mechanism 218. The attachment mechanism 218 may comprise a clasp, a hook, a catch, a thread, a hose, a tube, a channel, or other attachment mechanism 218 known in the art. In an alternate embodiment, the internal filter 204 may be attached to the dosing tank 202 by a weld, an adhesive, or the like. In yet another embodiment, the internal filter 204 may be formed with the dosing tank 202. For example, the internal filter 204 may be molded concurrently with the molding of the dosing tank 202.

The pump 206 receives dosing fluid from the dosing tank 202 and pumps the dosing fluid throughout the system 200. The pump 206 may be connected to the filter 204 by a hose, a tube, a channel, or the like. The pump 206, in one embodiment, may comprise a bladder pump, a peristaltic pump, or another pump commonly used in the art.

In an alternate embodiment, the pump 206 may be disposed within the dosing tank 202. The pump 206 may operate on the dosing fluid before the dosing fluid passes through the internal filter 204. In another embodiment, the pump 206 may be disposed within the dosing tank 202 and operate on the dosing fluid after it passes through the internal filter 204. For example, the pump 206 may be located within the internal filter 204 and pump the dosing fluid through the outlet 214 of the dosing tank 202.

The injector 208 injects dosing fluid into the exhaust stream 210, in one embodiment. The injector 208 may comprise one or more orifices configured to deliver the dosing fluid to the exhaust stream 210.

In certain embodiments, the dosing system 200 may include a recirculation line 220. In certain embodiments, the recirculation line 220 returns dosing fluid to the dosing tank 202 from the pump 206. The dosing system 200 may recirculate dosing fluid through the recirculation line 220 in response to a determination that dosing fluid is not being injected into the exhaust stream 210, for example, when the engine is off and not producing exhaust. The use recirculation line 220 may operate to protect the dosing fluid in the pump 206 from freezing during operation of the dosing system 200 in cold weather.

Figure 3:
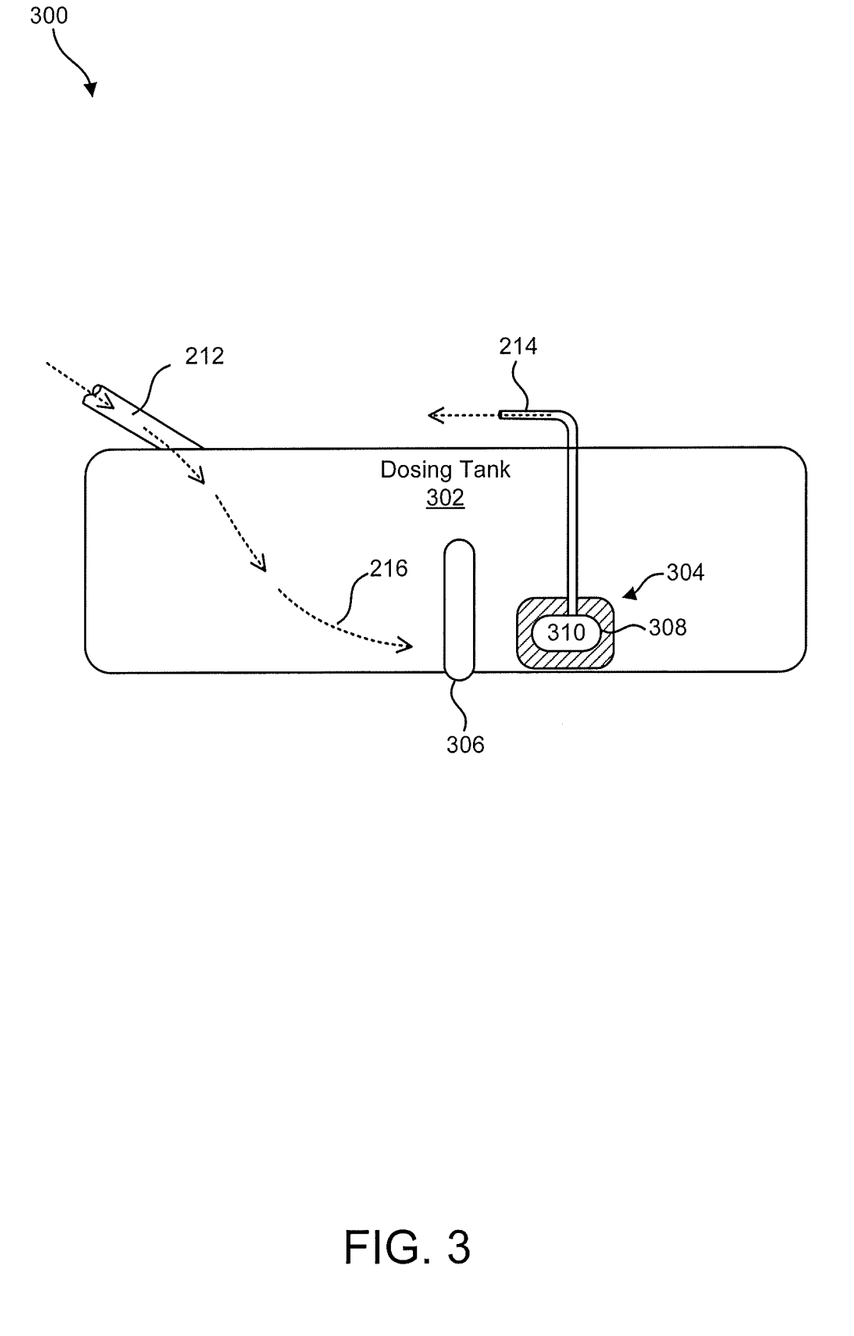
FIG. 3 is a schematic block diagram illustrating one embodiment of a dosing tank with an internal filter in a dosing system for an exhaust aftertreatment system in accordance with the present invention.

FIG. 3 illustrates a cross sectional view of one embodiment of a dosing tank 302 with an internal filter in a dosing system for an exhaust aftertreatment system in accordance with the present invention. The dosing tank 302, in one embodiment, includes an inlet 212, an outlet 214, an internal filter 304, and a heater 306. The dosing tank 302 receives, stores, and delivers a dosing fluid for use in the dosing system. The dosing tank 302 may comprise any material capable of holding the dosing fluid, such as a polymer, a metal, or the like. In one embodiment, the inlet 212 and outlet 214 are configured in a similar manner to like numbered components described in relation to FIG. 2.

The internal filter 304, is disposed within the dosing tank 302 in one embodiment. The internal filter 304 may comprise a filter media 308 and a support structure 310. The internal filter 304 filters a flow of dosing fluid 216.

The filter media 308 may comprise any media capable of removing contaminants from a dosing fluid. For example, the filter media 308 may comprise a cellulose material. In another example, the filter media 308 may comprise a polymer material. In one embodiment, the filter media 308 may comprise a melt-blown polymer depth media, as described below in relation to FIG. 7. As will be appreciated by one skilled in the art, the filter media 308 may comprise any material used in filter media. For example, the filter media may comprise nylon, polyester, polyoxymethylene (POM), polybutylene terephthalate (PBT), polyethylene terephthalate (PET), polyethylene naphthalate (PEN), polybutelyne naphthalate (PBN), HD-Polypropylene, Polyfluorethylen, Polyvinylidenedifluoride, Poly(perfluoroalkoxy) PFA, Polyisobutylene, Viton, LD-Polyethylene, and/or HD-Polyethylene The filter media 308 may be supported by a support structure 310. In one embodiment, the support structure 310 supports the filter media 308 to form a pathway for the flow of dosing fluid 216. The support structure 310 may separate adjacent surfaces of the filter media 308 to create a pathway for the flow of dosing fluid 216. As will be apparent to those skilled in the art in light of this disclosure, the filter media, depending on its structural integrity, may itself comprise the support structure.

For example, the support structure 310 may comprise one or more ribs on an interior surface of the filter media 308. The filter media 308 in this example may be formed like a sock with the opening of the sock attached to the outlet 214 of the dosing tank 302. The inside surface of the sock-shaped filter media 308 may be lined with one or more ribs forming a support structure 310 that hold adjacent interior surfaces of the sock-shaped filter media apart to form a pathway for a flow of dosing fluid 216.

The heater 306, in one embodiment, heats a dosing fluid in the dosing tank 302. The heater 306 may also heat the dosing fluid around the internal filter 304. Heating the dosing fluid maintains the dosing fluid above a minimum required temperature for use of the dosing fluid. For example, when urea is used as a dosing fluid, the heater 306 may maintain the dosing fluid in the tank at a temperature above the freezing point of urea, which is about −11 degrees centigrade.

Figure 4:
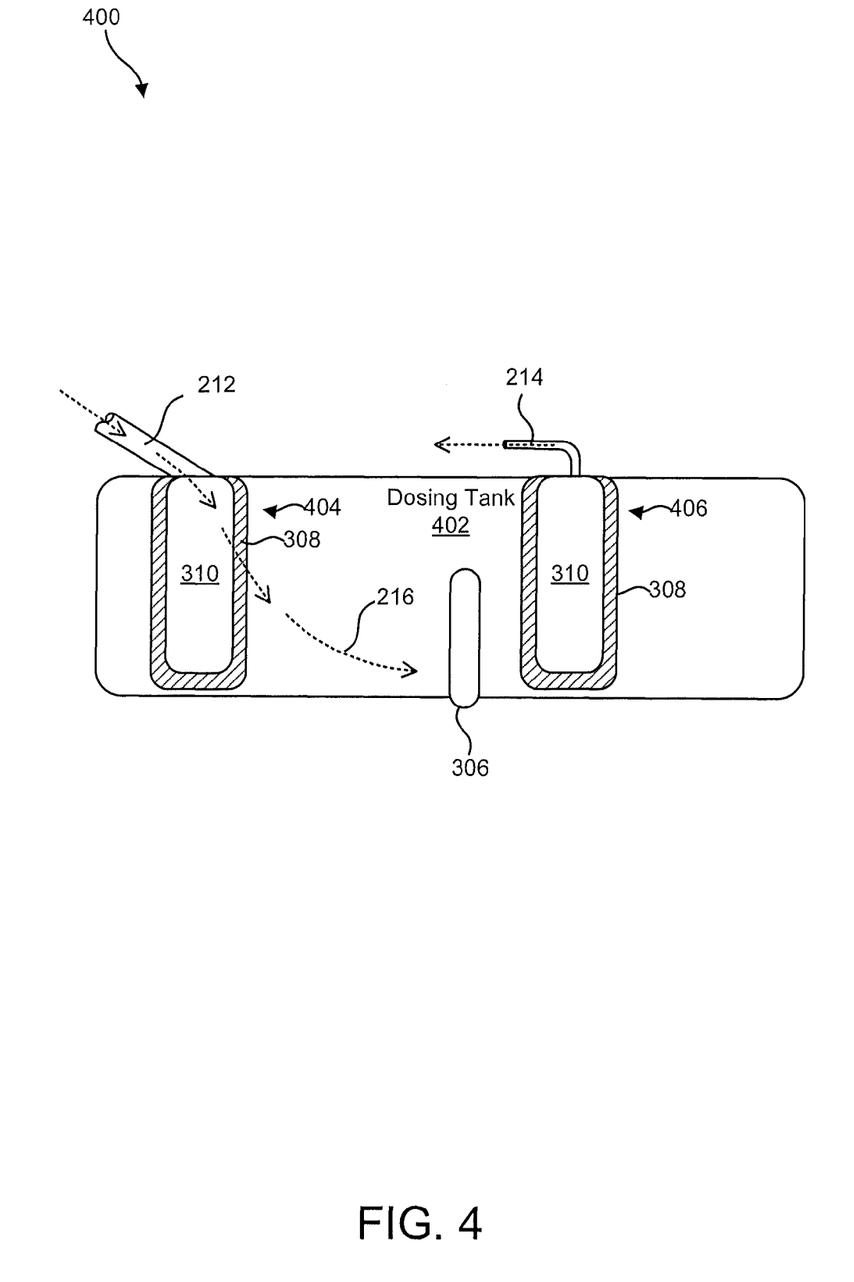
FIG. 4 is a schematic block diagram illustrating one embodiment of a dosing tank with internal filters in a dosing system for an exhaust aftertreatment system in accordance with the present invention.

FIG. 4 illustrates a cross sectional view of one embodiment of a dosing tank 402 with internal filters in a dosing system for an exhaust aftertreatment system in accordance with the present invention. The dosing tank 402, in one embodiment, includes an inlet 212, an outlet 214, an internal inlet filter 404, an internal outlet filter 406, and a heater 306. The dosing tank 402 receives, stores, and delivers a dosing fluid for use in the dosing system. The dosing tank 402 may comprise any material capable of holding the dosing fluid, such as a polymer, a metal, or the like. The inlet 212 and outlet 214 are preferably configured in a similar manner to like numbered components described in relation to FIG. 2. The heater 306 is preferably configured in a similar manner to a like numbered component described in relation to FIG. 3.

The internal inlet filter 404, is disposed within the dosing tank 402 in one embodiment. The internal inlet filter 404 may comprise a filter media 308 and a support structure 310. The internal inlet filter 404 filters a flow of dosing fluid 216 as it enters the dosing tank 402. The filter media 308 and the support structure 310 are preferably configured in a similar manner to like numbered components described in relation to FIG. 3.

In one embodiment, the internal inlet filter 404 is disposed within the dosing tank 402 and attached to the dosing tank 402 at the inlet 212. The internal inlet filter 404 may be positioned across the flow of dosing fluid 216 as it enters the dosing tank 402. In one embodiment, the internal inlet filter 404 may be formed into a sock configuration as described above in relation to FIG. 3 with the opening of the sock surrounding the inlet 212 of the dosing tank 402. In an alternate embodiment, the internal inlet filter 404 may be formed into a basket configuration with the opening of the basket surrounding the inlet 212.

The internal outlet filter 406, is disposed within the dosing tank 402 in one embodiment. The internal outlet filter 406 may comprise a filter media 308 and a support structure 310. The internal inlet filter 406 filters a flow of dosing fluid 216 as it exits the dosing tank 402. The filter media 308 and the support structure 310 are preferably configured in a similar manner to like numbered components described in relation to FIG. 3.

In one embodiment, the internal outlet filter 406 is disposed within the dosing tank 402 and attached to the dosing tank 402 at the outlet 214. The internal outlet filter 406 may be positioned across the flow of dosing fluid 216 as it exits the dosing tank 402. In one embodiment, the internal outlet filter 406 may be formed into a sock configuration as described above in relation to FIG. 3 with the opening of the sock surrounding the outlet 214 of the dosing tank 402. In an alternate embodiment, the internal outlet filter 406 may be formed into a basket configuration with the opening of the basket surrounding the outlet 214.

Figure 5:
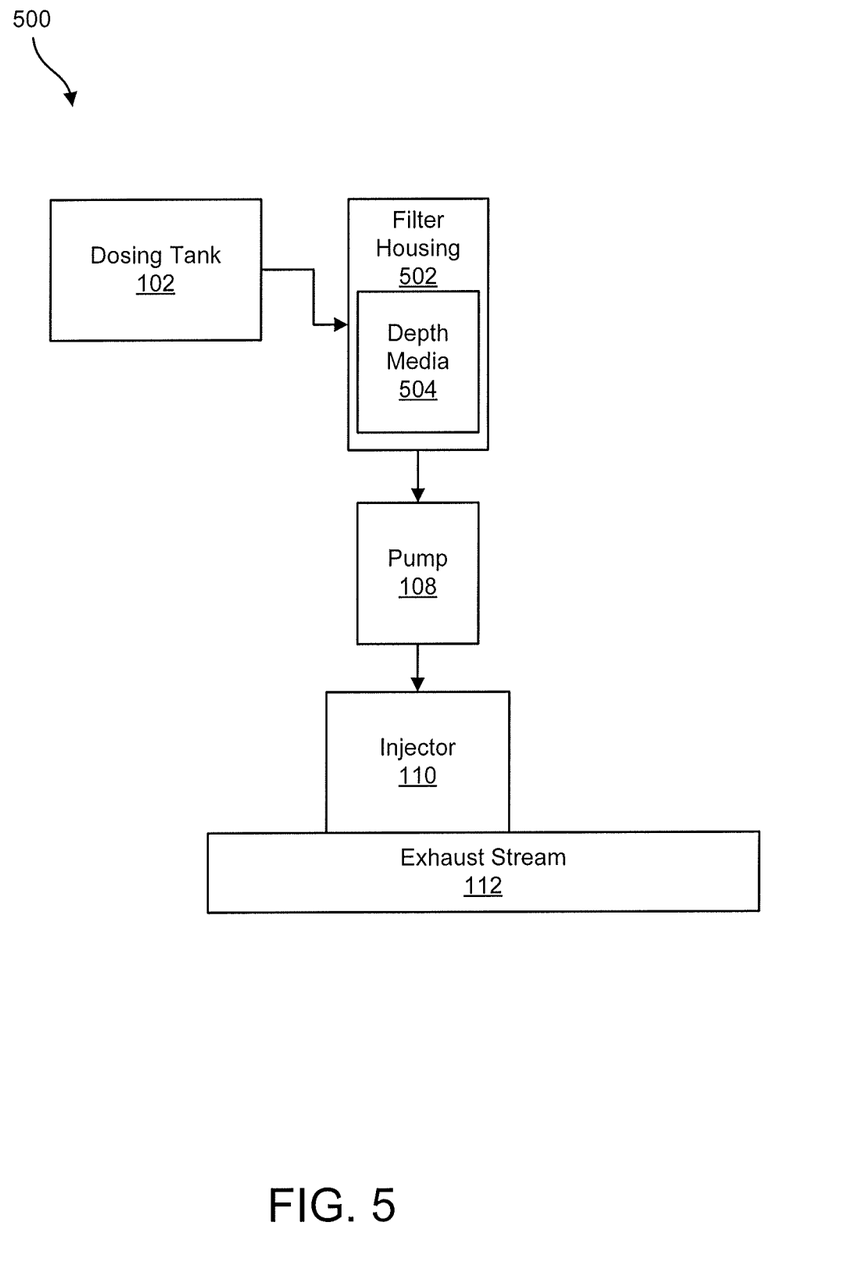
FIG. 5 is a schematic block diagram illustrating one embodiment of a dosing system for an exhaust aftertreatment system using depth media in accordance with the present invention.

FIG. 5 illustrates one embodiment of a dosing system 500 for an exhaust aftertreatment system using depth media in accordance with the present invention. The dosing system 500 comprises a dosing tank 102, a filter housing 502, depth media 504, a pump 108, an injector 110, and an exhaust stream 112. The dosing system 500 injects a dosing fluid into an exhaust stream 112 to reduce pollutants in the exhaust stream 112. The dosing tank 102, the pump 108, the injector 110, and the exhaust stream 112 are preferably configured in a similar manner to like numbered components described in relation to FIG. 1.

The filter housing 502, in one embodiment, provides a structure to contain the depth media 504 and provides a pathway causing the dosing fluid to flow through the depth media 504. In one embodiment, the filter housing 502 receives a flow of dosing fluid from the dosing tank 102.

The filter housing 502 may be serviceable, meaning that the depth media 504 may be removed from the filter housing 502 and replaced. In another embodiment, the filter housing 502 may be removably coupled to the dosing system 500, such that the filter housing with the associated depth media 504 may be removed and replaced. In yet another embodiment, the filter housing 502 may be a lifetime filter that does not require service under normal circumstances.

In one embodiment, the filter housing 502 is positioned in a dosing fluid flow path between the dosing tank 102 and the pump 108. In another embodiment, the filter housing 502 is positioned in a dosing fluid flow path between the pump 108 and the injector 110. In certain embodiments, the filter housing 502 may further comprise a heater.

The depth media 504 transects the dosing fluid flow path and removes contaminants from the dosing fluid as it passes through the depth media 504. In one embodiment, the depth media 504 comprises a series of layers having a decreasing porosity in the direction of the dosing fluid flow path. Depth media 504 is discussed in greater detail in relation to FIG. 7.

In one embodiment, the depth media 504 comprises a canister filter configuration as known in the art. The depth media 504 may comprise a melt-blown polymer material. In one embodiment, the depth media 504 may comprise a cellulose material. In yet another embodiment, the depth media 504 may comprise a combination of materials. For example, in one embodiment, the depth media 504 may comprise a pleated paper material in a canister configuration with one or more layers of polymer material disposed on an outer surface of the pleated paper material.

Figure 6:
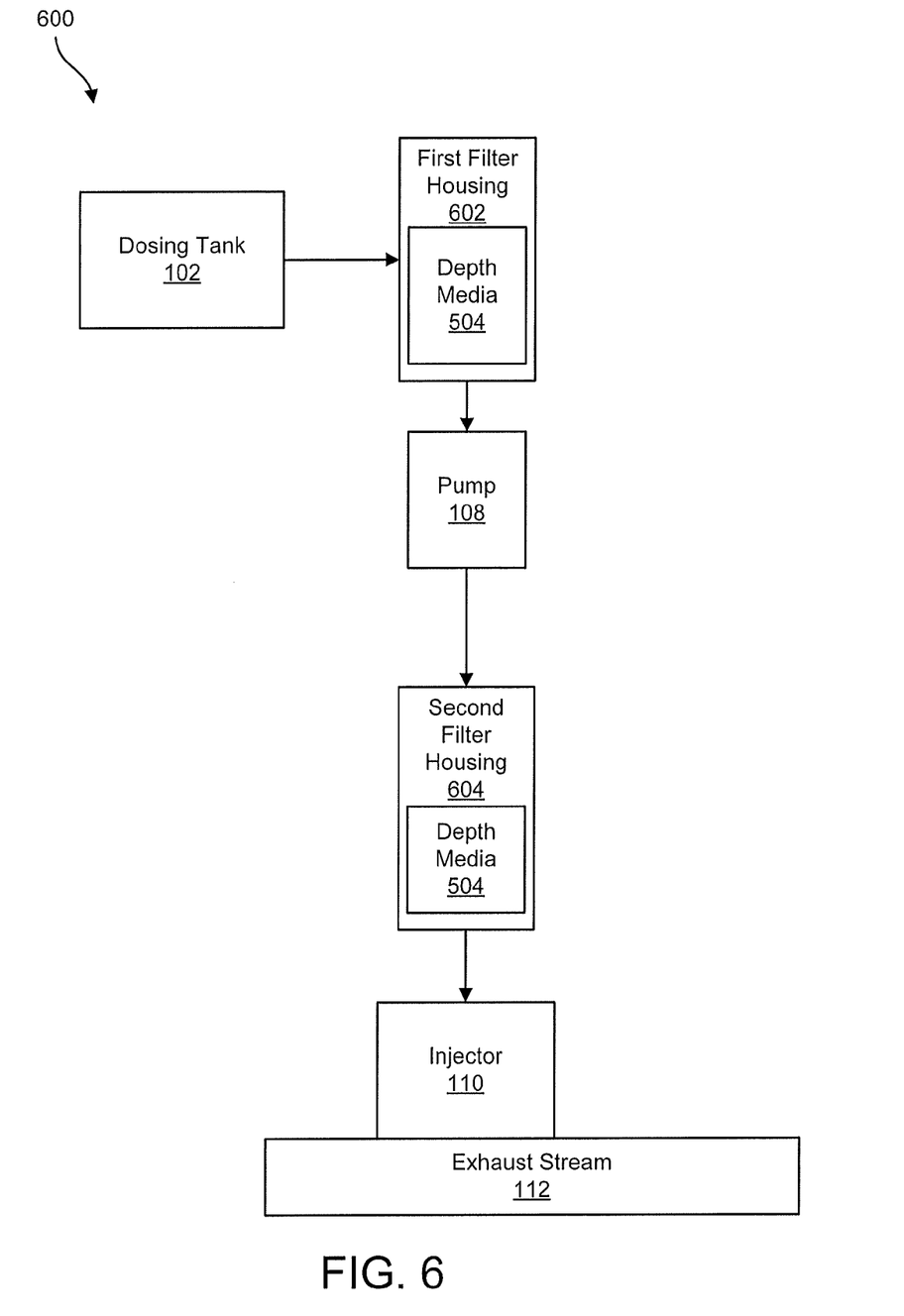
FIG. 6 is a schematic block diagram illustrating one embodiment of a dosing system for an exhaust aftertreatment system using gradient density depth filtration in accordance with the present invention.

FIG. 6 illustrates one embodiment of a dosing system 600 for an exhaust aftertreatment system using gradient density depth filtration in accordance with the present invention. The dosing system 600 comprises a dosing tank 102, a first filter housing 602, depth media 504, a pump 108, a second filter housing 604, an injector 110, and an exhaust stream 112. The dosing system 600 injects a dosing fluid into an exhaust stream 112 to reduce pollutants in the exhaust stream 112. The dosing tank 102, the pump 108, the injector 110, and the exhaust stream 112 are preferably configured in a similar manner to like numbered components described in relation to FIG. 1. The depth media 504 is preferably configured in a similar manner to a like numbered component described in relation to FIG. 5.

The first filter housing 602, in one embodiment, is configured in a similar manner to the filter housing 502 described in relation to FIG. 5. The first filter housing 602 may be disposed in a dosing fluid flow path between the dosing tank 102 and the pump 108. The first filter housing 602 may contain depth media 504 for filtering the dosing fluid. In certain embodiments, the first filter housing 602 may further comprise a heater.

The second filter housing 604, in one embodiment, is configured in a similar manner to the filter housing 502 described in relation to FIG. 5. The second filter housing 604 may be disposed in a dosing fluid flow path between the pump 108 and the injector 110. The second filter housing 604 may contain depth media 504 for filtering the dosing fluid. In certain embodiments, the second filter housing 604 may further comprise a heater.

Figure 7:
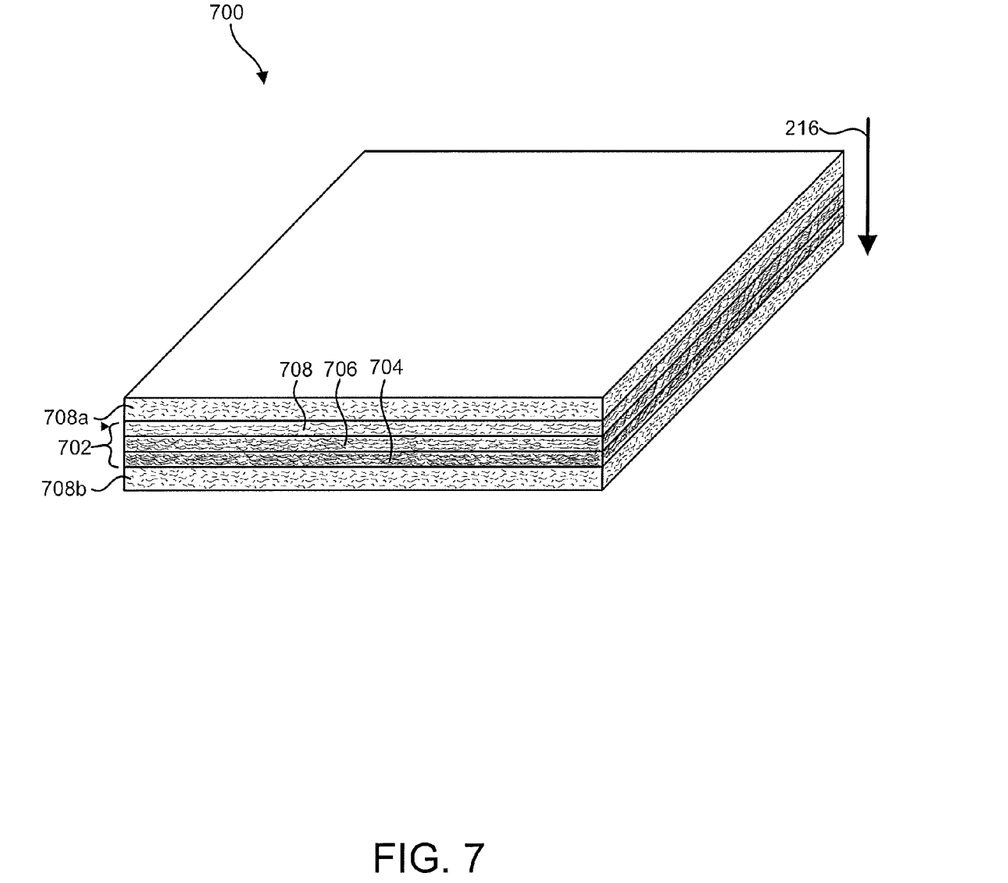
FIG. 7 is a cross-sectional view of one embodiment of a gradient density depth filtration system in accordance with the present invention.

Referring now to FIG. 7, a gradient density depth filtration system 700 for a dosing fluid in accordance with the present invention may generally comprise a melt-blown filtration assembly 702 having multiple meltblown layers 704, 706, and 708 of varying porosity—porosity as used here meaning the percentage of space in the layer. Indeed, variation in porosity produces corresponding variation in interstitial or pore size, thus providing varying layer filtration capabilities. This method of relying on porosity or density gradient variation to vary layer filtration capability facilitates an effective depth-media type filter made of acetal and/or another substantially dimensionally stable thermoplastic compatible with various dosing fluids.

In some embodiments, for example, a first layer 704 of the melt-blown filtration assembly 702 may include a porosity between about 90 and 98% to provide initial small particulate filtration. The first layer 704 may be coupled to a second layer 706 adapted to provide filtration of small particulates of a reduced magnitude. A porosity corresponding to the second layer 706 may range, for example, between about 85 and 97%. Finally, the second layer 706 of the melt-blown filtration assembly 702 may be coupled to a third layer 708 adapted to provide filtration of fine particulates. A porosity corresponding to the third layer 708 may range, for example, between about 80 and 96%. In this manner, the melt-blown filtration assembly 702 of the present invention provides increasingly fine filtration of a dosing fluid having a direction of travel 216 from the first layer 704 to the third layer 708. Of course, one skilled in the art will recognize that the first, second and third layers 704, 706 and 708 of the melt-blown filtration assembly 702 disclosed above are for illustrative purposes only, and that a melt-blown filtration assembly 702 in accordance with the present invention may include any number of layers arranged to provide increasingly fine filtration. Further, in some embodiments, the melt-blown filtration assembly 702 may include a graduated arrangement of melt-blown microfilaments integrated into a unitary whole, such that the melt-blown filtration assembly 702 is substantially devoid of individually identifiable layers. In one embodiment, the melt-blown filtration assembly 702 may include a single layer.

In some embodiments, the melt-blown filtration assembly 702 may be coupled to at least one general filtration element 708 adapted for relatively coarse filtration, thus further contributing to a graduated filtering effect. In certain embodiments, the melt-blown filtration assembly 702 may be sandwiched between two general filtration elements 708a and 708b to substantially encapsulate the more delicate melt-blown layers of the melt-blown filtration assembly 702, thereby protecting the melt-blown filtration assembly 702 as well as contributing to overall filtration.

The general filtration element 708a and 708b may include a spun bonded filtration medium, referring to that class of nonwoven materials where newly formed filaments are immediately subjected to cold air to stop their attenuation. The general filtration element 708a and 708b may have a porosity more than a porosity corresponding to the first layer 704 of the melt-blown filtration assembly 702, such that the general filtration element 708a and 708b provides preliminary filtration of relatively large particulate matter from a fluid. The general filtration element 708a and 708b may comprise, for example, spun bonded nylon, polyester, acetal, Teflon®, or other spun bonded filtration medium known to those in the art. The average filament diameter of such a medium may comprise, for example, about 100 μm.

Figure 8:
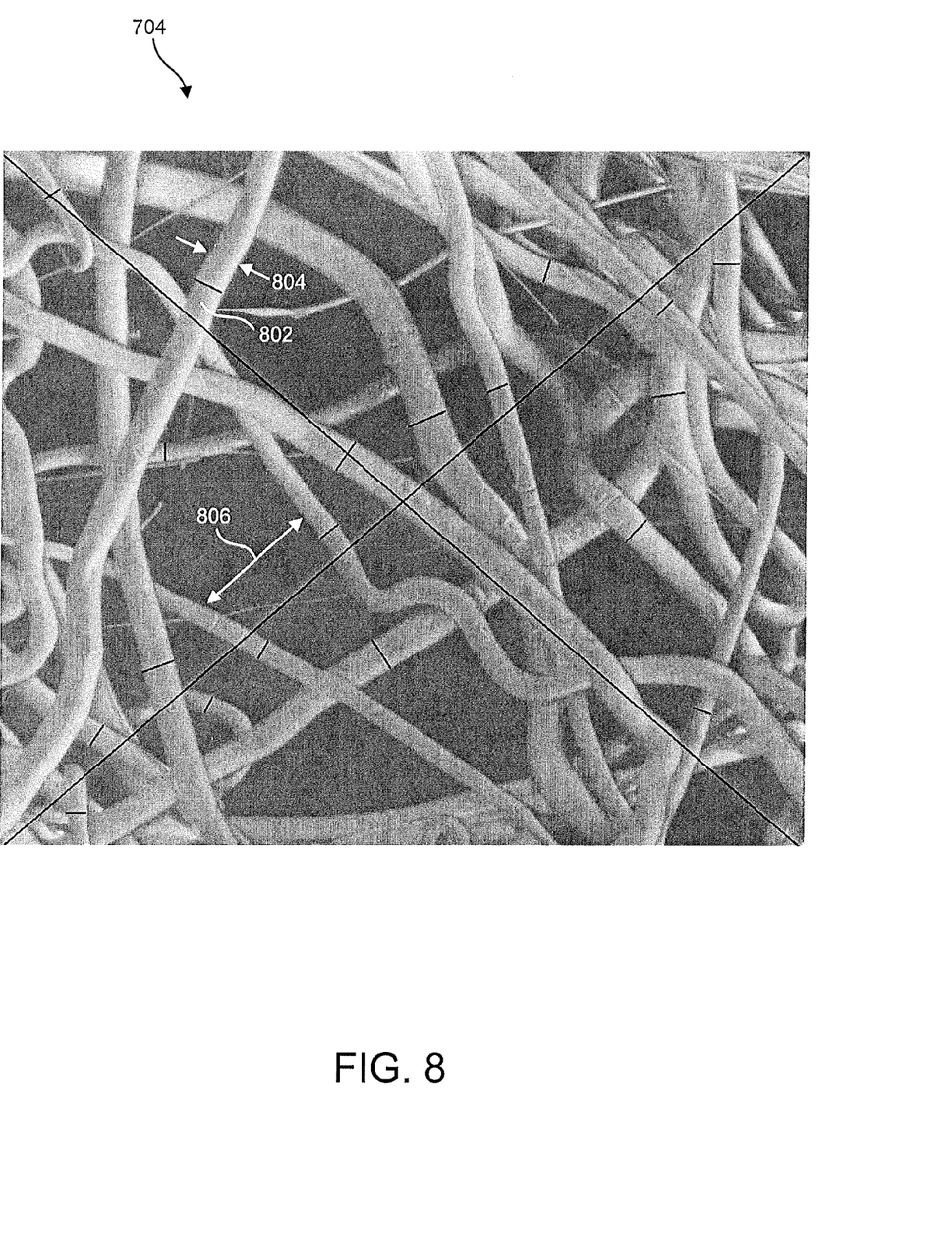
FIG. 8 is a magnified top view of melt-blown microfilaments forming a first layer of a melt-blown filtration assembly in accordance with certain embodiments of the present invention.

FIG. 8 is a magnified top view of melt-blown microfilaments forming a first layer of a melt-blown filtration assembly in accordance with certain embodiments of the present invention. In one embodiment, a substantially dimensionally stable thermoplastic such as acetal may be melt-blown to produce microfilaments 802 having a substantially constant diameter size 804. In some embodiments, for example, a diameter 804 of each microfilament may range between about 2.5 and 30 μm. As illustrated by FIG. 8, the first layer 704 of the melt-blown filtration assembly 702 of the present invention may comprise a porosity 806 of about 96% to provide coarse porosity filtration of a fluid. The second layer 706, as shown in FIG. 7, may include microfilaments 802 substantially equal in diameter 804 to those shown in FIG. 8. The second layer 706 microfilaments 802, however, may comprise a porosity 806 of about 94% to provide intermediate porosity filtration of the dosing fluid. Finally, the third layer 708, illustrated by FIG. 7, may comprise microfilaments 802 comparable in diameter 804 to the first and second layers 704 and 706 depicted by FIG. 7, although the third layer 708 may demonstrate a porosity 806 of about 92 to provide fine porosity depth filtration.

The melt-blown microfilaments 802 may comprise polymeric, melt blown microfilaments. In certain embodiments, the microfilaments may comprise nylon, polyester, polyoxymethylene (POM), polybutylene terephthalate (PBT), polyethylene terephthalate (PET), polyethylene naphthalate (PEN), polybutelyne naphthalate (PBN), HD-Polypropylene, Polyfluorethylen, Polyvinylidenedifluoride, Poly(perfluoroalkoxy) PFA, Polyisobutylene, Viton, LD-Polyethylene, and/or HD-Polyethylene The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
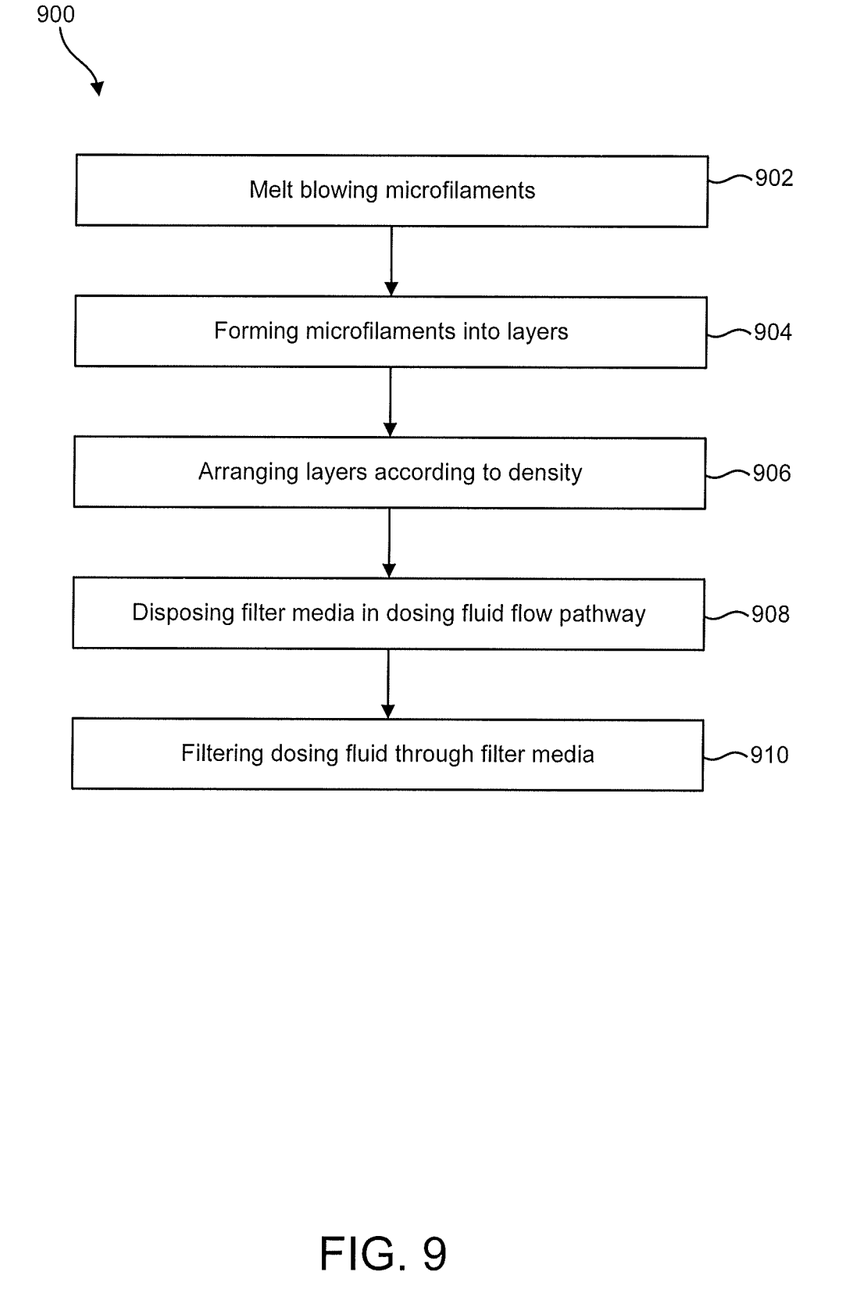
FIG. 9 is a schematic flow chart diagram illustrating one embodiment of a method for deploying a filter for a dosing fluid in an exhaust aftertreatment system in accordance with the present invention.

FIG. 9 is a schematic flow chart diagram illustrating one embodiment of a method 900 for deploying a filter for a dosing fluid in an exhaust aftertreatment system in accordance with the present invention. The method 900 is in certain embodiments a method of use of the system and apparatus of the previous figures, and will be discussed with reference to those figures.

As shown in FIG. 9, the method 900 begins with melt blowing 902 microfilaments 802. The microfilaments 802 may comprise a substantially stable thermoplastic having a substantially constant diameter as described in relation to FIG. 8.

Next, the microfilaments 802 are formed 904 into a layer having a substantially constant porosity 806. The microfilaments 802 may be formed into a plurality of layers, each layer having a different porosity 806. For example, the microfilaments may be formed into a first layer 704, a second layer 706, and a third layer 708, each layer having a progressively smaller porosity 806.

Next, a plurality of melt-blown layers are arranged 906 according to their relative densities to form a filtration assembly 702. For example, the first layer 704, second layer 706, and third layer 708 discussed above may be arranged in order to form a filtration assembly 702. In one embodiment, the layers may be laminated to form a cohesive filtration assembly 702.

Next, the filtration assembly 702 is disposed 908 in a dosing fluid flow pathway 216. The filtration assembly 702 may be disposed 908 within a dosing tank 202. In another embodiment, the filtration assembly 702 may be disposed 908 in the dosing fluid flow pathway 216 outside of the dosing tank, such as in a filter housing 502.

Finally, dosing fluid is filtered 910 through the filter media of the filter assembly 702. Filtration 910 occurs as contaminants suspended in the dosing fluid are trapped by the layers of the filtration assembly 702.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for filtering a mono-nitrogen oxide ($NO_x$) reducing agent in an exhaust aftertreatment system to chemically reduce pollutants in an exhaust stream, the method comprising:
    containing a mono-nitrogen oxide ($NO_x$) reducing agent in a dosing tank, the dosing tank containing a filter media and a heating element within the dosing tank exposed to the mono-nitrogen oxide ($NO_x$) reducing agent;
    transferring heat from the heating element through the mono-nitrogen oxide ($NO_x$) reducing agent to the filter media;
    urging the mono-nitrogen oxide ($NO_x$) reducing agent through the filter media; and
    causing the mono-nitrogen oxide ($NO_x$) reducing agent to exit the dosing tank, after the mono-nitrogen oxide ($NO_x$) reducing agent has passed through the filter media.

2. The method of claim 1, further comprising heating the mono-nitrogen oxide ($NO_x$) reducing agent within the dosing tank.

3. The method of claim 1, further comprising pumping the mono-nitrogen oxide ($NO_x$) reducing agent through a recirculation line.

4. The method of claim 1, wherein the mono-nitrogen oxide ($NO_x$) reducing agent is at least one of urea and ammonia.

5. The method of claim 1, wherein the filter media comprises a plurality of layers defining a gradient density depth filter.

6. The method of claim 5, wherein a porosity of the gradient density depth filter decreases in a flow direction of the mono-nitrogen oxide ($NO_x$) reducing agent.

7. The method of claim 1, wherein the filter media comprises multiple meltblown layers of varying porosity.

* * * * *